United States Patent [19]

Batcher et al.

[11] Patent Number: 4,776,204

[45] Date of Patent: Oct. 11, 1988

[54] THREAD DETECTING PROBE DEVICE

[75] Inventors: Alfred J. Batcher, Clawson; Michael L. Jones, Fraser, both of Mich.

[73] Assignee: Antares Engineering, Inc., Madison Heights, Mich.

[21] Appl. No.: 12,958

[22] Filed: Feb. 10, 1987

[51] Int. Cl.[4] ........................................... G01B 13/10
[52] U.S. Cl. ...................................................... 73/37.9
[58] Field of Search ................................ 73/37.9, 37.8

[56] References Cited

U.S. PATENT DOCUMENTS

| | | | |
|---|---|---|---|
| 2,669,864 | 2/1954 | Brewster | 73/37.9 |
| 3,793,875 | 2/1974 | Jurkiewicz | 73/37.9 X |
| 4,437,335 | 3/1984 | Gates | 73/37.9 |

*Primary Examiner*—Stewart J. Levy
*Assistant Examiner*—Joseph W. Roskos
*Attorney, Agent, or Firm*—John R. Benefiel

[57] ABSTRACT

A probe device is disclosed for checking threaded bores in a workpiece to detect various abnormal conditions including a broken tool or probe, absence of the workpiece or bore, or the threaded condition of the bore. The probe is affixed to a transversely mounted piston which is actuated by air pressure to move the probe sideways during a phase of the probing action in which a probe tip is moved against the surface to be tested, blockage of an air outlet occurring if the surface is unthreaded. The resulting increase in air pressure is detected by a pressure switch to enable operation of a fault signal. The probe tip is slidably mounted in the main body of the probe to be moved back as the probe is advanced towards the workpiece in the initial phase of the test if a bore is absent or a broken tool is lodged therein, with porting shutting off air flow to the tip air outlet to also cause an increase in back pressure enabling generation of a fault signal.

8 Claims, 2 Drawing Sheets

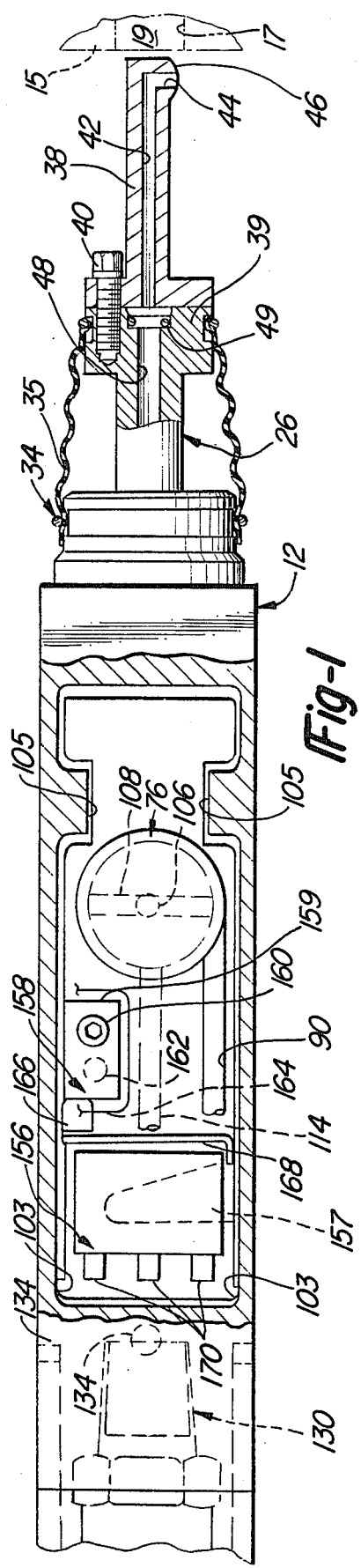

THREAD DETECTING PROBE DEVICE

BACKGROUND OF THE INVENTION

1. Field of the Invention

This invention concerns devices for checking machined workpieces, and more particularly devices for checking surfaces of workpieces to verify the presence of threads and also to detect various abnormal test piece conditions.

2. Description of the Prior Art

In U.S. Pat. No. 4,437,335, there is disclosed a device for accomplishing the above objective, in which a probe spindle is pivotally mounted in a housing, the probe having an attached elongated probe tip extending from one end thereof. The proble spindle is slidably movable to the rear within a probe body, and has an internal passage supplied with air under pressure exiting through a side outlet adjacent the tip end.

The probe device is moved towards the presumed location of the bore in the workpiece in the first phase of the test, and if the probe tip encounters either a broken tool or an unformed bore, the air flow is throttled by movement of the tip back into the probe body, which condition in turn is detected as a back pressure increase by a pressure switch mounted in the probe housing.

In a second phase, initiated after the probe tip has moved within the test piece bore, the probe spindle is tilted about a pivot axis by a side mounted piston. If the probe moves too far before encountering the side wall of the test piece bore, a limit switch is tripped, providing a fault condition signal for an oversize bore, or the absence of the probe tip or the test piece itself.

When the probe tip does encounter the bore sidewall, that surface will substantially block outflow from the probe tip, unless threads are present, to again cause increased back pressure, which blockage is detected by the pressure switch to generate a "no thread" fault condition signal.

In copending application Ser. No. 845,956, filed on Mar. 31, 1986, assigned to the same assignee as the present application, there is disclosed an improved version of this device, in which refinements are made of the actuation of the pivoting of the probe, and for the arrangement for mounting of the unit to a tooling plate.

The pivoting motion of the probe has disadvantages, particularly for an increased extent of pivoting travel, in that tilting of the probe spindle allows the tip air outlet to become skewed with respect to the test surface, allowing escape of air despite being positioned against the surface. Any tendency for this to occur obviously reduces the reliability of obtaining an increased back pressure reading when the surface is unthreaded. That is, if air leakage occurs due to tilting of the tip, this could mask the absence of threads on the tested surface in that an increased back pressure would not occur despite the absence of threads.

The pivoting of the probe also limits the range of motion able to be achieved by a reasonably compact device. The range of tip motion available to move the tip against the bore sidewall is important as this allows lower tolerances in the position error of the probe tip within the bore to be tested. In addition, the range of travel improves the reliability of the over limit movement detection phase of the test.

SUMMARY OF THE INVENTION

The present invention comprises a thread sensor device in which the probe spindle is slidably mounted in a bore in a probe slide. The probe slide is mounted and actuated to undergo purely translational movement in a housing in a direction transverse to the probe axis. The probe slide is affixed to an actuation piston received in a housing cylinder bore, also extending sideways to the probe axis, and the piston is actuated upon pressurization of the piston cylinder against the bias of a pair of spaced compression springs. Guide surfaces formed on a housing recess guide the probe slide in its movement within the housing.

The probe device has the advantage that the translational movement of the probe slide maintains more precisely the normal orientation of the air outlet at the probe tip with respect to the surface to be tested, notwithstanding a relatively great range of motion of the probe slide as it is moved so as to cause the probe tip to engage the surface to be tested.

The probe device according to the present invention has the further advantage of allowing a relatively great range of probe tip travel in a compact device, providing reduced positional accuracy requirements with respect to prepositioning of the probe tip in the bore to be tested, and improved reliability in detecting overtravel during that preliminary phase of the testing cycle.

The piston is itself utilized as a distributor member by a passage communicating air pressure to a port formed in the probe slide, which port is moved out of registry with a normally aligned port in the probe spindle if the probe tip encounters an obstruction.

A normally open limit switch is engaged with a ramp surface on an overtravel detection dog mounted to the probe slide, the ramp surfce configured so as to open the limit switch after a predetermined extent of travel of the probe slide in its lateral movement, selected to detect a fault condition.

This arrangement allows a reliable and failsafe detection of the test faults associated with an overtravel of the probe slide lateral movement.

DESCRIPTION OF THE DRAWINGS

FIG. 1 is a top view of the probe device according to the present invention with a probe tip disposed opposite a hole to be tested.

FIG. 2 is a partially sectional fragmentary view of a probe device shown in FIG. 1 with the probe tip broken away.

DETAILED DESCRIPTION

Figure 3:
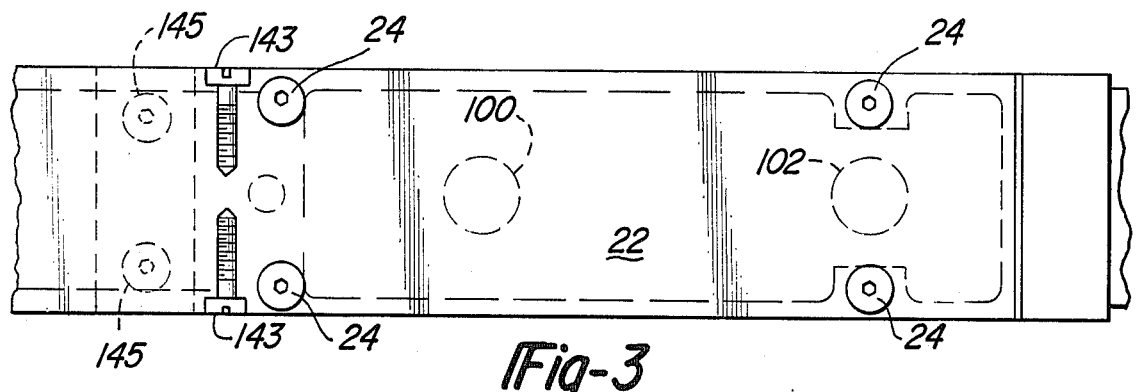
FIG. 3 is a fragmentary bottom view of the probe device shown in FIG. 1.
Figure 4:
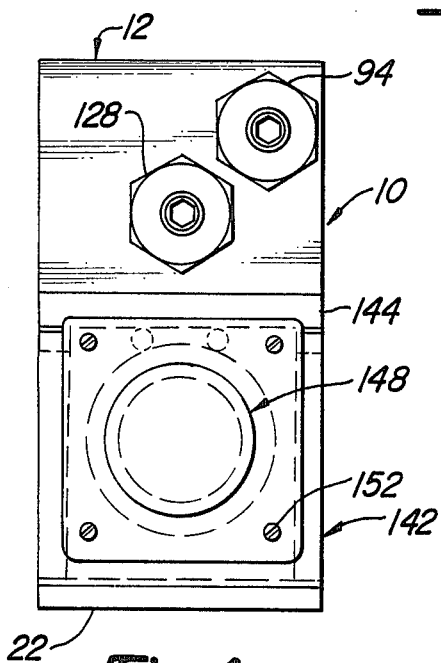
FIG. 4 is a rear end view of the probe device shown in FIG. 1.
Figure 5:
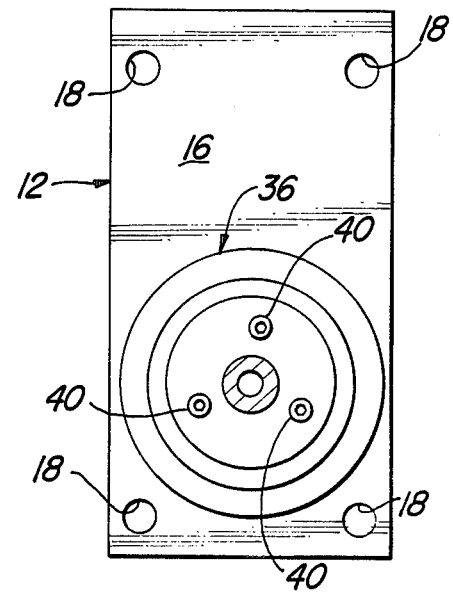
FIG. 5 is a front end view of the probe device shown in FIG. 1 with the probe tip broken away.

In the following detailed description, certain specific terminology is used for the sake of clarity and a particular embodiment described in accordance with 35 USC 112, but the same is not intended to be limiting and should not be so construed inasmuch as the invention is capable of taking many forms within the scope of the appended claims.

Referring to the Drawings, the probe device 10 according to the present invention includes a housing 12 formed by a machined steel casting, defining an interior space 14 (FIG. 2) receiving the various components of the device. The right hand end face 16 is adapted to be mounted against a tooling plate 20 as by cap screws received in tapped holes 18.

The probe device 10 is carried to and from a workpiece 15 (FIG. 1) to be tested by the tooling plate 20 in the manner well known to those skilled in the art.

The housing interior space 14 is closed off by a bottom cover 22 secured to the housing 12 with screws 24, a gasket 23 sealing the interfitting surfaces.

The probe device 10 includes an elongated probe spindle 26 projecting out from the right end of the housing 12 as viewed in FIG. 1, through a bore 28 formed in end wall 30 of the housing 12, and bore 32, formed in a bushing 34. Bushing 34 is received in bore 36 in the tooling plate 20 to accurately locate the same, as described in the above copending application Ser. No. 845,956 filed on Mar. 31, 1986.

A dust cover 35 is secured with a retainer 37, and prevents entrance of contaminants into the clearances with the bores 28 and 32 while accommodating lateral movements of the probe spindle 26.

The probe spindle 26 has affixed to its end 36 an elongated replaceable probe tip 38, by a series of cap screws 40. The probe tip 38 is intended to be variously configured to suit the requirements of a particular testing application, but generally is formed with a longitudinally extending passage 42 and a transverse outlet 44 exiting out through a radiused surface 46 formed on the side of the end of the probe tip 38. The passage 42 receives air from an aligned longitudinal passage 48 formed in the probe spindle 38, O-ring seal 49 preventing escape of air between the probe tip 38 and probe spindle 26.

When the probe tip 38 is carried towards the side wall 17 of a bore 19 formed in the workpiece 15, as will be described, surface 46 will come into contact with side wall 17, and outlet 44 will be covered. If the side wall 17 is unthreaded, this will result in substantial blockage of the outflow of air and an increase in back pressure upstream of the outlet 44, but if threads are present, air will continue to escape through the interstices between the threads. This effect allows reliable detection of the presence or absence of threads only if the surface 46 does not become skewed to a degree so as to allow the free escape of air even in the absence of threads.

Surface 46 is typically radiused as shown to alleviate this problem, but if the probe tip 38 is tilted to be brought into contact with the side wall 17, as in the prior art devices, there is a considerable tendency for excessive skewing to occur, increasing with the extent of tilt required to conduct the test.

Thus the probe spindle 26 is carried through lateral, purely translational movements within the probe housing 12 during the test cycle according to the concept of the present invention.

This movement of the probe spindle 26 is accomplished by mounting and actuation means including a rectangular in section probe slide 50, having a lengthwise bore 52 slidably receiving the probe spindle 26 to allow the probe spindle to be moved, as when the probe tip 38 encounters an obstruction as the probe device 10 is carried towards the workpiece 15, such as a broken tool, or an unformed or incompletely formed bore 19. This movement takes place against the bias of a compression spring 54 bearing against end face 56 of the probe spindle 26 and against a shoulder 58 of a bumper plug 60 pressed into a counterbore 62 of the probe slide 50.

Figure 6:
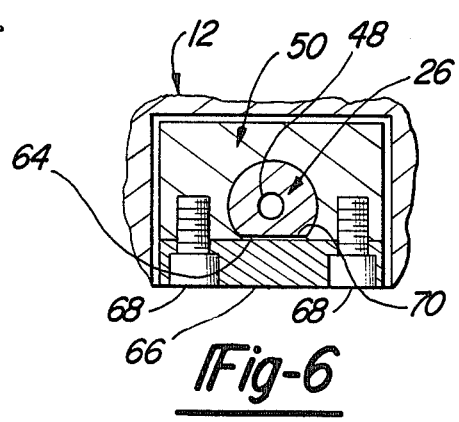
FIG. 6 is a view of the section 6-6 taken in FIG. 2.

Probe spindle 26 is formed with a flat 64, and a retainer bar 66 extends thereacross, secured with cap screws 68 received in the probe slide 50 (FIG. 6).

The interfitting of the flat 64 and inner surface 70 of retainer bar 66 act to maintain a proper orientation of the probe spindle 26 in bore 52 and thus the probe tip 38, and also acts as a limiting stop for the probe spindle 26 in its outward travel under the influence of compression spring 54.

The probe spindle 26 is limited in its inward travel by a contact of endface 56 with bumper plug 60.

Bumper plug 60 is preferably formed of Delrin or similar plastic to reduce the shock of impacts therewith.

The passage 48 is supplied with air under pressure by test air supply means including porting means controlled by the longitudinal position of the probe spindle 26 in bore 52. This porting means includes a port 72 formed in a wall of the probe slide 50 aligned with a side port 74 communicating with passage 48, ports 72 and 74 normally aligned with each other. O-ring seals 76 and 78 seal the perimeter of the probe spindle 26 to prevent escape of air through the clearance with bore 52.

After a predetermined extent of inward travel of the probe spindle 26 in bore 52, ports 72 and 74 move out of registry, blocking air flow into passage 48 to cause an increase in backpressure upstream of the port 72, which is detected as will be described, to enable the obstruction fault test phase to be accomplished.

The mounting and actuation means further includes a piston 76 extending transversely to the axis of the probe spindle 26 and fixed to the probe slide 50 by having an end 78 pressed into a bore 80 formed into the top side of the probe slide 50.

The piston 76 is received into a cylinder bore 82 machined into the housing 12, the piston and cylinder interfit to allow stroking of the piston therein. O-ring seals 84 and 86 seal the piston and cylinder clearance space.

The cylinder space opposite the end face 88 is adapted to be pressurized by means including a supply passage 90 opening into the cylinder bore 82, and communicating with a supply port 92 at the rear face of housing 12, adapted to receive a fitting 94 to connect to a source of air pressure 96 and solenoid valve 98.

Thus, upon pressurization of cylinder bore 82, piston 78 is stroked to carry the probe slide 50 laterally in a purely transitional movement, against the bias of a pair of spaced return springs 100 and 102 interposed between cover 22 and probe slide 50. Guide surfaces 103 and 105 are formed in the housing 12 engaging the probe slide 50 to guide the probe slide 50 in its lateral translational movement (FIG. 2).

The testing air supply means further includes passages formed in the piston 76, including a flared portion 104 opposite port 72 of a lengthwise passage 106 extending from a cross hole 108. The flared configuration of portion 104 ensures alignment with port 72 in any orientation of the piston 76. An annular recess 110 is aligned with cross hole 108 and a supply port 112 formed by the terminus of a test air supply passage 114 formed in the housing 12. Passage 114 receives air via a port 116 at the rear face of the housing 12. Port 116 houses a filter plug 118, spacer 120, O-ring seals 122, and a metering disc 124, having an orifice 126 formed therein. Port 116 is adapted to receive a fitting 128 to be connected to a suitable source 120 of pressurized air.

Orifice 126 is of suitably small diameter (i.e., 0.0225 inches) to establish a substantial pressure drop when air is flowing therethrough. Upon a cessation of flow due to blockage of tip outlet 44 or port 72, a substantial increase in pressure downstream of the orifice 126 immediately occurs.

This pressure is constantly monitored by a pressure sensing switch 130 mounted in housing 12 by being threaded into a tapered bore 132 formed therein. Tapered bore 132 enters into a cross passage 134 communicating with test air supply passage 114 so that pressure sensing switch 130 is exposed to the test air pressure subject to increase in back pressure.

The pressure sensing switch 130 is of a commercially available type, in which contacts are opened at a predetermined pressure, i.e., at 12 psig occurring in the increasing direction.

The pressure sensing switch 130 is housed in a space 140 defined by a three sided extension 142 of cover 22 fastened to housing 12 with screws 143 (FIG. 3), and an angled cover 144 secured to the housing 12 with screws 145, and to cover extension 144 by a screw 146 received in swage nut 147 carried by angled cover 146.

An electrical connector 148 is mounted in the end leg 150 of angled cover 144 by screws 152 and adapted to mate with a connector 154, connecting to the electrical leads (not shown) of the pressure sensing switch 130 and a limit switch 156 to the external system circuitry.

Normally open limit switch 156 is mounted within the housing 12 with flange 157 and acts to detect overtravel of the probe spindle 26 corresponding to fault conditions, i.e., tip 38 missing, workpiece 15 missing, or bore 19 oversized.

For this purpose an over travel detection element 158 received in housing recess 159 is affixed to the probe slide 50 with a cap screw 160 and accurately located with a dowel 162.

Overtravel detection element 158 is preferably formed of low frictional coefficient plastic such as Delrin, shaped with a ramp surface 164 engaged with a roller 166 mounted to an engagement leaf 168 of the limit switch 156.

Ramp surface 164 is configured so as to restrain outward travel of the roller 166 until travel has occurred to an extent corresponding to a fault condition. This causes the contacts of the limit switch to open when the probe slide has been moved to reach the overtravel limit. Thus an electrical signal is transmitted via terminals 170 to the system controls (not shown) to activate a fault signal.

Accordingly, it can be appreciated that a compact, simple, but reliable configuration is provided, the translational movement of the probe spindle reducing the incidence of false results because of skewing of the probe tip. A relatively great range of movement of the probe spindle is afforded by a compactly sized probe device.

We claim:

1. A probe device of the type including an elongated probe spindle movably mounted in a housing to carry a probe tip laterally towards a surface to be tested, air supply means supplying air under pressure to an outlet orifice opening into a lateral surface of said probe tip and back pressure sensing means detecting increases in back pressure occurring upon blockage of said probe tip orifice, to enable detection of the absence of threads formed on said surface to be tested by bringing said tip orifice against said surface to be tested and detecting an increase in back pressure corresponding to a substantially complete blockage of said probe tip orifice by an absence of threads, the improvement comprising:

mounting and actuation means mounting said probe spindle for lateral translation through a range of movement in said housing, and for actuating said probe tip back and forth through said range of lateral motion to enable said probe tip orifice to be moved normally towards and away from a surface to be tested.

2. The probe device according to claim 1 wherein said mounting and actuation means comprises a probe slide carrying said probe spindle, said probe slide having a bore formed therein slidably receiving said probe spindle for endwise movement therein;

a piston affixed to said probe slide extending laterally therefrom, a cylinder bore receiving said piston, means for pressurizing said cylinder bore so as to actuate said piston and cause said lateral movement of said probe slide and said probe spindle carried therewith; and return spring means acting on said probe slide to return said probe slide when said cylinder is depressurized.

3. The probe device according to claim 2 further including an overtravel detection feature attached to said probe slide, a normally closed limit switch having an engagement element, and a ramp surface on said overtravel detection feature configured to be normally engaged by said engagement element through a portion of the range of said lateral movement of said probe slide, and becoming disengaged after a predetermined extent of travel corresponding to a fault condition so as to open said limit switch.

4. The probe device according to claim 2 wherein said air supply means includes a passage extending through said piston and also includes porting means communicating with said passage until said probe spindle moves back a predetermined distance into said probe slide due to contact of said probe tip with an obstruction.

5. The probe device according to claim 4 wherein said piston is formed with an end received into a piston bore formed in said probe slide extending towards said bore receiving said probe spindle but terminating to form a wall therebetween, and wherein said porting means comprises a port formed in said wall extending between said piston bore and said probe spindle bore, said port aligned with said piston passage to establish fluid communication therebetween.

6. The probe device according to claim 5 wherein said piston passage comprises an annular groove portion, a transverse hole portion extending at either end into said groove portion, a longitudinal passage extending from said transverse hole, and a flared portion at said piston end.

7. The probe device according to claim 2 further including guide surfaces formed in said housing engaging said probe slide during said lateral movement thereof to guide said movement.

8. The probe device according to claim 2 wherein said probe spindle is formed with a flat for a portion of its length and further including a retainer bar mounted to said probe slide extending across said flat so as to prevent rotation of said probe spindle in said probe slide bore and to limit movement of said probe spindle out of said bore.

* * * * *

UNITED STATES PATENT AND TRADEMARK OFFICE
CERTIFICATE OF CORRECTION

PATENT NO. : 4,776,204
DATED : October 11, 1988
INVENTOR(S) : Alfred J. Batcher & Michael L. Jones It is certified that error appears in the above-identified patent and that said Letters Patent is hereby corrected as shown below:

Column 1, line 17, "proble" should be --probe--.

Signed and Sealed this

Fourteenth Day of March, 1989

Attest:

DONALD J. QUIGG

Attesting Officer

Commissioner of Patents and Trademarks